S. W. MASSEY.
CUTTER AND SLICER.
APPLICATION FILED SEPT. 7, 1912.
1,074,637.
Patented Oct. 7, 1913.
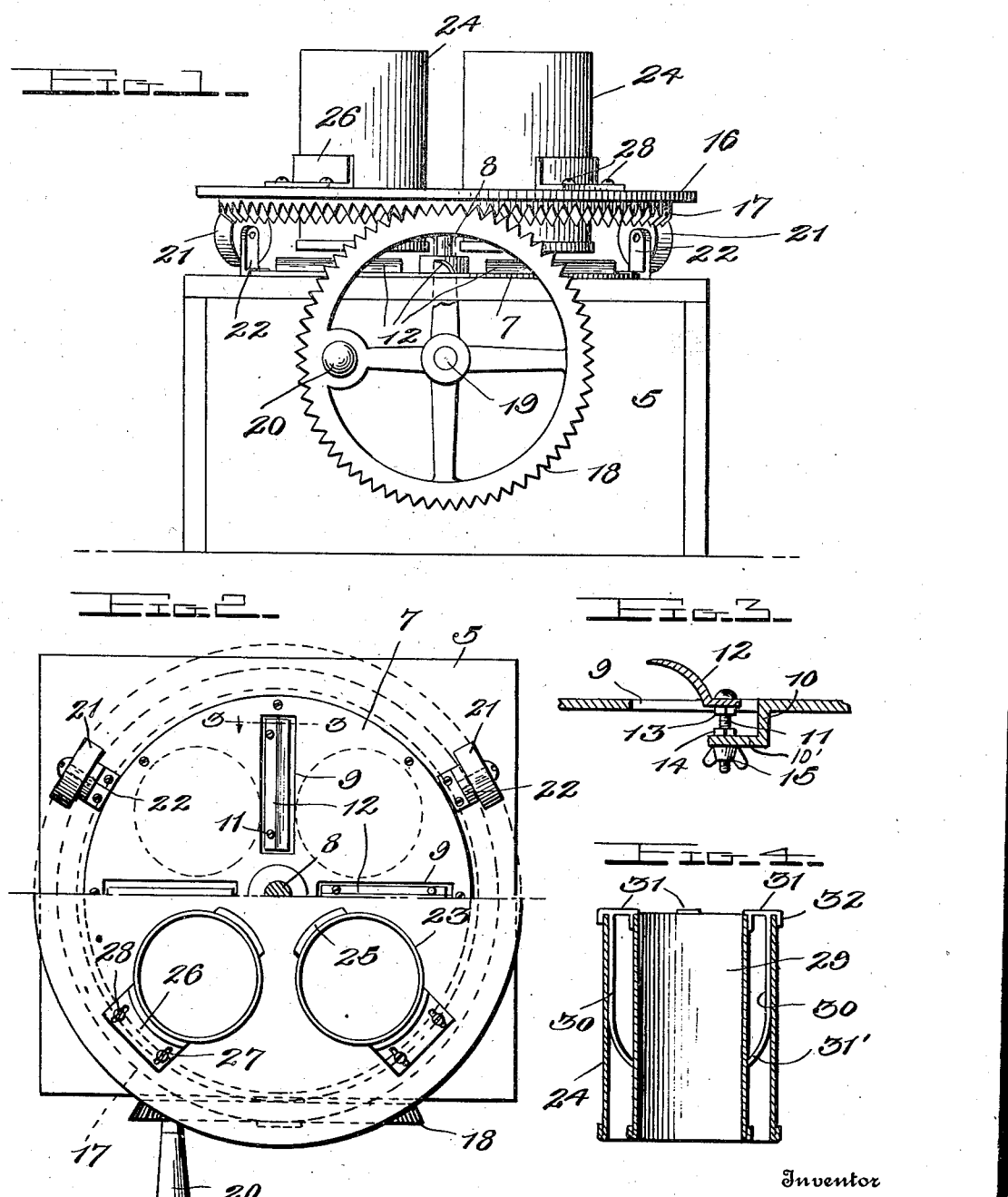
Witnesses
Chas. L. Griesbauer.
A. I. Hind.
Inventor
S. W. Massey,
By Watson E. Coleman,
Attorney

UNITED STATES PATENT OFFICE.

SANFORD WOOLF MASSEY, OF SOUTH BELLINGHAM, WASHINGTON.

CUTTER AND SLICER.

1,074,637.    Specification of Letters Patent.    Patented Oct. 7, 1913.

Application filed September 7, 1912. Serial No. 719,148.

*To all whom it may concern:*

Be it known that I, SANFORD WOOLF MASSEY, a citizen of the United States, residing at South Bellingham, in the county of Whatcom and State of Washington, have invented certain new and useful Improvements in Cutters and Slicers, of which the following is a specification, reference being had to the accompanying drawings.

This invention relates to new and useful improvements in cutting and slicing devices for vegetables, fruits and the like and has for its primary object to provide a simple, durable and efficient device of this character the parts of which may be readily assembled, and which is easily maintained in a thoroughly sanitary condition and will not be liable to easily get out of order.

Another and more specific object of the invention resides in the provision of a plurality of receiving cylinders for vegetables or fruit, removably secured upon a rotary base, and a detachable cylinder adapted to be inserted within the first named cylinders and improved retaining means therefor whereby the device may be adapted for the cutting or slicing of fruits and vegetables of various sizes.

A still further object of the invention is to produce a cutting and slicing machine of the above character which requires but a minimum amount of manual exertion for its operation and may be manufactured at comparatively small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of a device embodying my invention; Fig. 2 is a top plan view thereof, the cylinder supporting base or table being partly broken away; Fig. 3 is a detail section taken on the line 3—3 of Fig. 2; and Fig. 4 is a detail vertical section of one of the vegetable receiving cylinders showing a detachable cylinder positioned therein.

Referring in detail to the drawing, 5 designates a supporting stand, which is preferably though not necessarily, of rectangular form in plan and is open upon one side to permit of the insertion of a dish or other receptacle beneath the top of the stand to receive the cut or sliced material. The top 6 of the stand is provided with an opening which is covered by means of the plate 7, said plate being secured at its edges by means of screws or analogous fastening elements to the top of the stand. The plate 7 is provided with a central upright spindle 8, the purpose of which will be later explained. At diametrically opposite points the plate 7 is provided with the radial slots 9, and said plate at one of the longitudinal edges of said slots is formed with angular downwardly extending flanges 10, the horizontal portions of which are disposed beneath the slots 9. In these horizontal portions of the flanges 10 and at opposite ends thereof, the vertically disposed threaded bolts 11 are mounted. Upon these bolts, cutting blades 12 are arranged, said blades being clamped against the headed upper ends of the bolts by means of the nuts 13. It will be noted from reference to Fig. 3 that the blades 12 are of concavo-convex form and extend upwardly from the slots 9 above the surface of the plate 7, the cutting edges of the blades being located contiguous to the longitudinal edges of the slots opposite to the edges whereon the flanges 10 are formed. The bolts 11 are provided with additional nuts 14 for engagement with the upper faces of the horizontal portions 10' of the flanges 10 and wing nuts 15 are threaded upon the lower ends of said bolts to engage the under surfaces of said flanges and securely clamp the cutting blades in their adjusted positions. It will be readily seen that by means of this improved mounting for the cutting blades, they may be projected to any desired extent above the surface of the plate 7.

Upon the upper end of the vertical spindle 8 a disk 16 is mounted to rotate. This disk has formed upon its under surface and adjacent to its periphery, a circular series of beveled gear teeth 17 which are adapted to mesh with a mitered gear wheel 18 journaled on a stub shaft 19 fixed in one of the side walls of the stand 5, said wheel being provided with a suitable handle 20. In order to properly support the disk 16 in a horizontal plane and prevent oscillatory movement thereof upon the spindle 8, I provide the idler rollers 21 which are mounted upon suitable supporting brackets 22 fixed to the top wall 6 of the stand 5, in equidistant relation.

The disk 16 is provided with a plurality of openings 23, in the present instance four in number, in which the cylinders or hoppers 24 are detachably secured. To this end, upstanding plates 25 are formed upon the disk 16 at the edge of each of the openings 23 and at points diametrically opposed to the plates 25, the adjustable clamping plates 26 are mounted upon said disk, the latter plates being provided with slots 27 through which the shanks of the securing screws 28 are disposed, said screws being threaded in the disk 16. The opposed faces of the plates 25 and 26 are concaved, to closely engage upon the cylinders 24. It will be understood that by simply adjusting the movable clamping plates 26, the cylinders may be readily secured in the openings in the disk 16 or removed therefrom. They can also be vertically adjusted to properly space their open lower ends from the cutting blades 12 in accordance with the size of the material being sliced.

In Fig. 4 of the drawing, there is shown an insertible cylinder 29 which is adapted to be disposed within the cup 24 and is securely held in position by means of a plurality of spring plates 30. These spring plates extend longitudinally of the cylinder 29 and exteriorly thereof and are integrally formed at one of their ends with the laterally extending arms 31 which are fixed to the end of the cup 29. The outer ends of these arms are provided with angularly disposed lugs 32 disposed in spaced parallel relation to the plates 30. The free ends of the plates 30 are inwardly curved as indicated at 31'. In inserting the cylinder 29 within the cup 24, the spring plates 30 engage the inner wall of the latter cylinder, the upper edge of said cylinder being received between said plates and the lugs 32. The inward movement of the cylinder 29 forces the spring plates 30 inwardly and engages their curved lower ends 31' with the periphery of the insertible cylinder. Thus a close frictional engagement of the plates 30 with the wall of the cylinder 24 is effected so that the inner cylinder will be securely retained in position.

From the foregoing description it is believed that the construction and manner of operation of my improved cutter and slicer will be apparent. The vegetables or fruits to be cut are placed within the cylinders 24 which have previously been adjusted to dispose their lower open ends with relation to the cutting blades 12. The wheel 18 is now turned so that the disk 16 will be rotated. The cylinders 24 carry the material into engagement with the cutting edges of the blades 12, so that the same will be sliced, the slices moving through the slots 9 and into the dish or receptacle arranged beneath the top of the stand 5. By adjusting the knives 12 in the manner above explained, the thickness of the slices may be regulated as desired. When smaller fruits or vegetables are to be sliced, the cylinders 29 are inserted within the cylinders 24, so that the material is held in the smaller cylinders and properly carried into contact with the cutting edges of the blades.

A cutting and slicing machine constructed in the manner above described may be inexpensively manufactured, is strong and durable and admits of the quick and proper slicing of large quantities of fruits or vegetables with a minimum of labor upon the part of the operator. The material receiving cylinders as well as the cutting blades may be easily and quickly removed and thoroughly cleaned, thus maintaining the machine in a sanitary condition.

While I have described and illustrated the present preferred embodiment of the invention, it will be obvious that the device is susceptible of considerable modification in the form and construction of the several elements without departing from the essential features or sacrificing any of the advantages thereof.

Having thus described the invention, what is claimed is:

1. In a device of the character described, a material receiving cylinder open at both ends, an insertible cylinder, laterally extending arms secured upon one end of the latter cylinder, each of said arms having an angularly disposed lug formed upon its outer end, and a spring plate formed on said arm adjacent to the lug and extending in parallel relation to the inner cylinder for frictional engagement with the inner wall of the outer cylinder to detachably retain the inner cylinder in position.

2. In a device of the character described, a material receiving cylinder open at both ends, an insertible cylinder, laterally extending arms secured to one end of the latter cylinder, a spring plate integrally formed on each of said arms and extending longitudinally of the cylinder in frictional engagement with the inner wall of the first named cylinder to a point adjacent the free end of said spring plate, the free end of said plate being inwardly curved and adapted to engage the periphery of the inner cylinder when the same is inserted within said outer cylinder, the longitudinally extending portion of said plate frictionally engaging the wall of the outer cylinder to detachably retain the insertible cylinder therein.

3. In a device of the character described, a material receiving cylinder, a second cylinder insertible within the first named cylinder and disposed in spaced concentric relation thereto, laterally extending arms secured to one end of said insertible cylinder at diametrically opposite points, each of said arms being provided with a lug on its outer end for engagement over the upper edge of said outer cylinder, a spring plate integrally formed with said arm contiguous to said lug and extending in spaced parallel relation to said outer cylinder and in frictional engagement with the inner wall thereof, the free end of said spring plate being inwardly curved and adapted for engagement at its extremity with the periphery of said insertible cylinder.

In testimony whereof I hereunto affix my signature in the presence of two witnesses.

SANFORD WOOLF MASSEY.

Witnesses:
 WALTER L. MASSEY,
 FRANK M. MASSEY.